United States Patent
Sato

(10) Patent No.: US 6,747,810 B2
(45) Date of Patent: Jun. 8, 2004

(54) SINGLE FOCUS LENS HAVING SHORT OVERALL LENGTH

(75) Inventor: Kenichi Sato, Ageo (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/364,385

(22) Filed: Feb. 12, 2003

(65) Prior Publication Data

US 2003/0161051 A1 Aug. 28, 2003

(30) Foreign Application Priority Data

Feb. 20, 2002 (JP) ........................................ 2002-043138

(51) Int. Cl.⁷ .............................. G02B 13/18; G02B 9/34
(52) U.S. Cl. ...................... 359/715; 359/716; 359/773; 359/774; 359/792
(58) Field of Search ................................. 359/773, 774, 359/715, 716, 786–788, 792

(56) References Cited

U.S. PATENT DOCUMENTS 5,251,069 A * 10/1993 Iizuka ........................ 359/717
5,303,087 A * 4/1994 Hayakawa et al. ......... 359/708
5,973,848 A * 10/1999 Taguchi et al. ............. 359/651
5,999,337 A    12/1999 Ozaki

FOREIGN PATENT DOCUMENTS

JP   H05-157962   6/1993
JP   H11-125767   5/1999

* cited by examiner

Primary Examiner—Georgia Epps
Assistant Examiner—Deborah Raizen
(74) Attorney, Agent, or Firm—Arnold International; Bruce Y. Arnold

(57) ABSTRACT

A single focus lens is disclosed that is formed of only four lens components, which are arranged in positive, negative, positive and relatively weak positive or negative refractive power order from the object side, with a stop arranged between the first and second lens components. The third lens component has a convex surface on its image side, and the fourth lens component has a meniscus shape, is made of plastic, includes at least one aspheric surface, and is concave on its image side. The second lens component is formed of a single lens element, and various conditions are preferably satisfied so as to provide a compact lens having a short overall length while favorably correcting various aberrations.

4 Claims, 3 Drawing Sheets

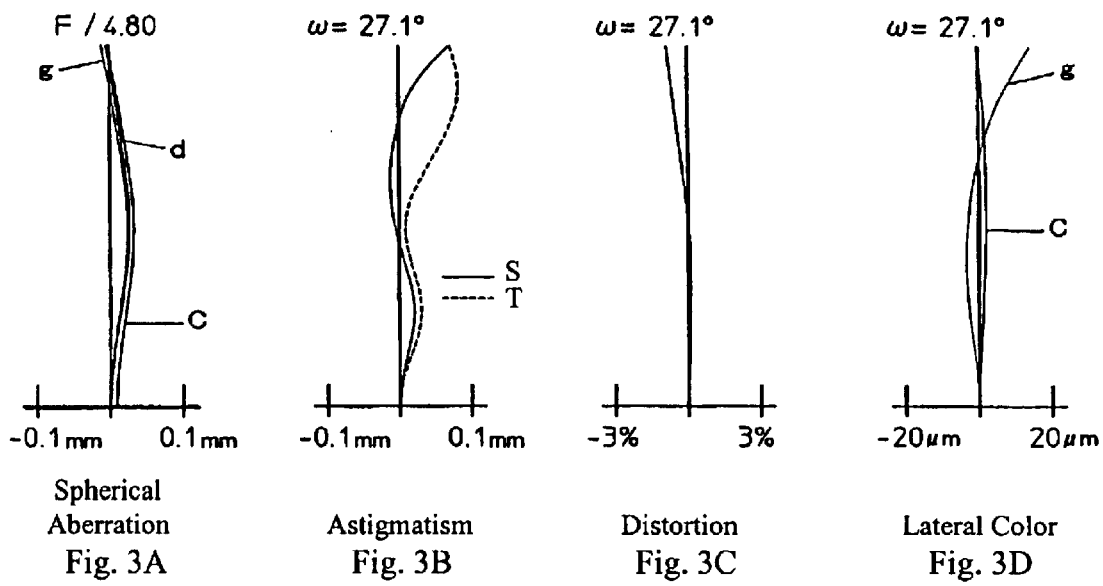
Spherical Aberration
Fig. 3A
Astigmatism
Fig. 3B
Distortion
Fig. 3C
Lateral Color
Fig. 3D
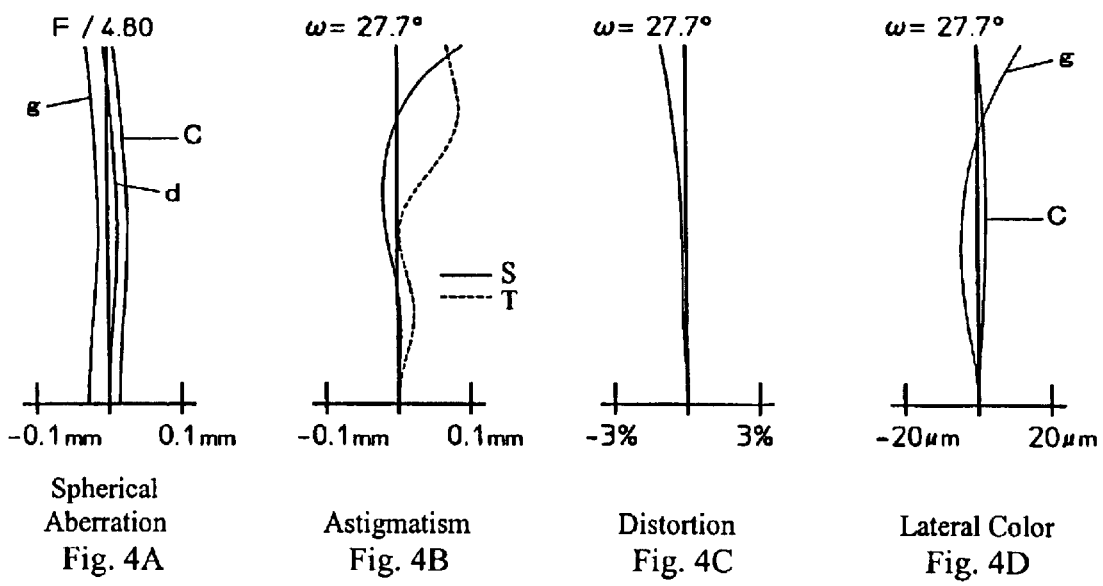
Spherical Aberration
Fig. 4A
Astigmatism
Fig. 4B
Distortion
Fig. 4C
Lateral Color
Fig. 4D

SINGLE FOCUS LENS HAVING SHORT OVERALL LENGTH

BACKGROUND OF THE INVENTION

Conventionally, through advances in charge coupled device (i.e., CCD) manufacturing technology, the size of a pixel has become smaller and the number of pixels in an array has increased. As a result of these advances, high density image sensors that employ CCDs have come to be used in electronic still cameras and other small CCD cameras.

Photographic lenses as set forth in Japanese Laid Open Patent Application H5-157962 and in Japanese Laid open Patent Application H11-125767, for example, are known to respond to such demands. The former application is a front-shutter-type photographic lens composed of four lens groups totaling five lens elements, with a stop positioned on the object side of the first lens group, and the latter application is a photographic lens composed of two lens groups totaling six lens elements, with a stop positioned between the first lens group and the second lens group.

High quality imaging is important for imaging lenses that are to be used in CCD cameras. Moreover, there is currently a strong demand for reduction in size and lower costs for such cameras. In recent years, CCDs have been widely used in digital cameras, but in the future, CCDs are expected to be incorporated into thin devices such as clocks, handheld tools such as mobile phones, and electronic notepads. In order to be used in such types of thin devices, a photographic lens that has a short overall length will become crucial. Thus, a photographic lens having optical properties that are substantially equivalent to the optical properties of conventional lenses, while further reducing the number of components so as to reduce the size and to lower costs, is in great demand.

BRIEF SUMMARY OF THE INVENTION

The present invention relates to a single focus lens having a short overall length that is suitable for use in small photographic devices and which provides high quality images. More particularly, the present invention is a single focus lens made of only four lens components, preferably four lens elements, thereby providing a low cost lens which has its aberrations favorably corrected and is particularly suited for use in digital cameras.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 3A–3D show the spherical aberration, astigmatism, distortion, and lateral color, respectively, of the single focus lens having a short overall length according to Embodiment 1 of the invention; and FIGS. 4A–4D show the spherical aberration, astigmatism, distortion, and lateral color, respectively, of the single focus lens having a short overall length according to Embodiment 2 of the invention.

DETAILED DESCRIPTION

The single focus lens having a short overall length according to the present invention is formed of, in order from the object side, a first lens component having positive refractive power, a stop, a second lens component having negative refractive power, a third lens component having positive refractive power with a convex surface on the image side, and a fourth lens component having a meniscus shape with at least one surface thereof being aspheric and having a concave surface on the image side. The fourth lens component has relatively weak refractive power and is used to correct for aberrations.

The single focus lens having a short overall length preferably has the second lens component formed of a single lens element, and satisfies the following Conditions (1) to (3):

| | |
|---|---|
| $N_{d2} > 1.8$ | Condition (1) |
| $\nu_{d2} < 25$ | Condition (2) |
| $|f/f_4| < 0.8$ | Condition (3) | where
$N_{d2}$ is the refractive index at the d-line of the lens element of the second lens component, in order from the object side,
$\nu_{d2}$ is the Abbe number at the d-line of the lens element of the second lens component, in order from the object side,
f is the focal length of the single focus lens having a short overall length, and
$f_4$ is the focal length of the fourth lens component, in order from the object side.

The aspheric surface expression which represents the shape of the aspheric surface of the fourth lens component preferably includes at least one, non-zero, odd-numbered coefficient.

Figure 1:
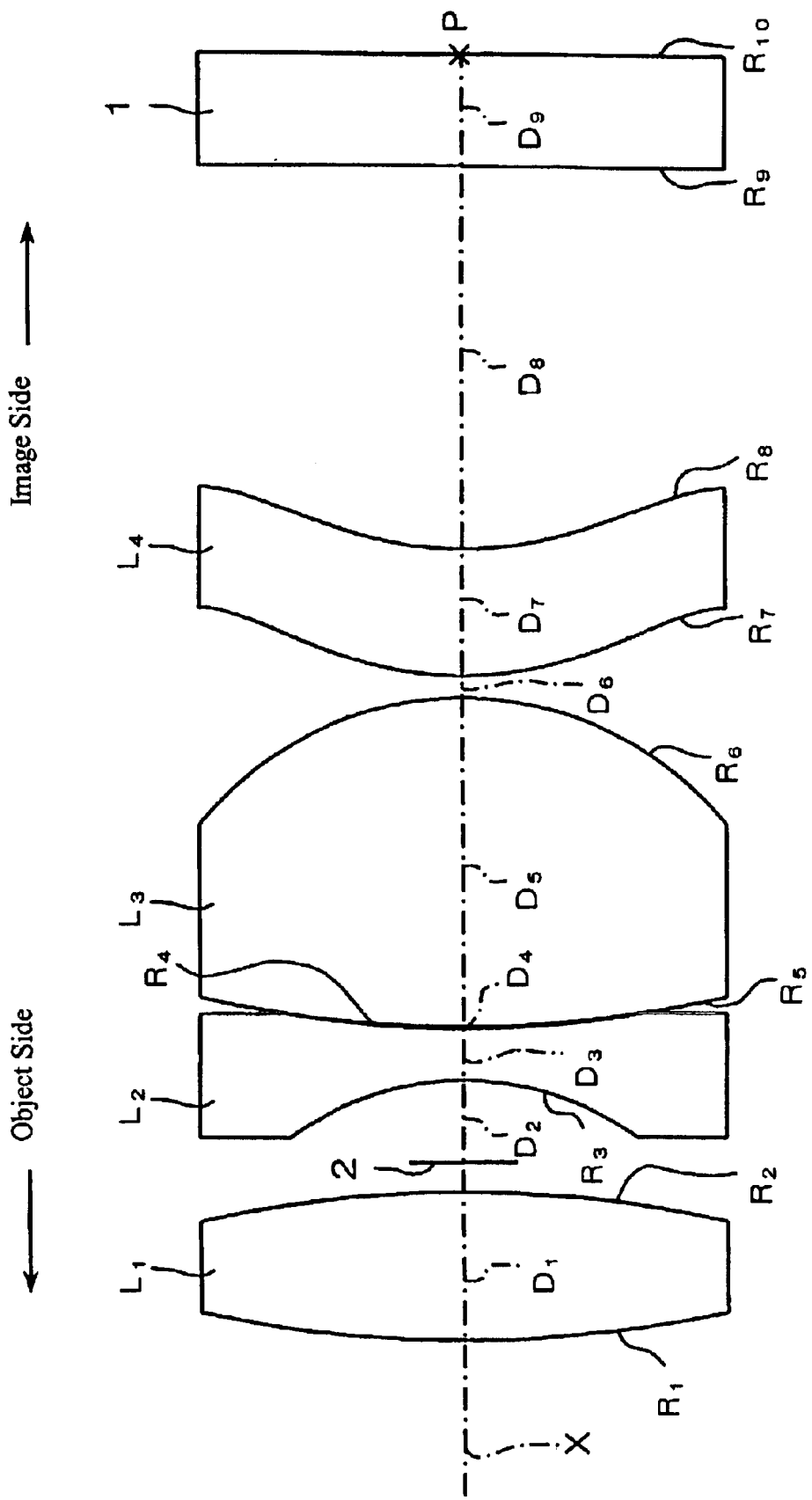
FIG. 1 shows the basic lens element configuration of a single focus lens having a short overall length according to Embodiment 1 of the present invention.
Figure 2:
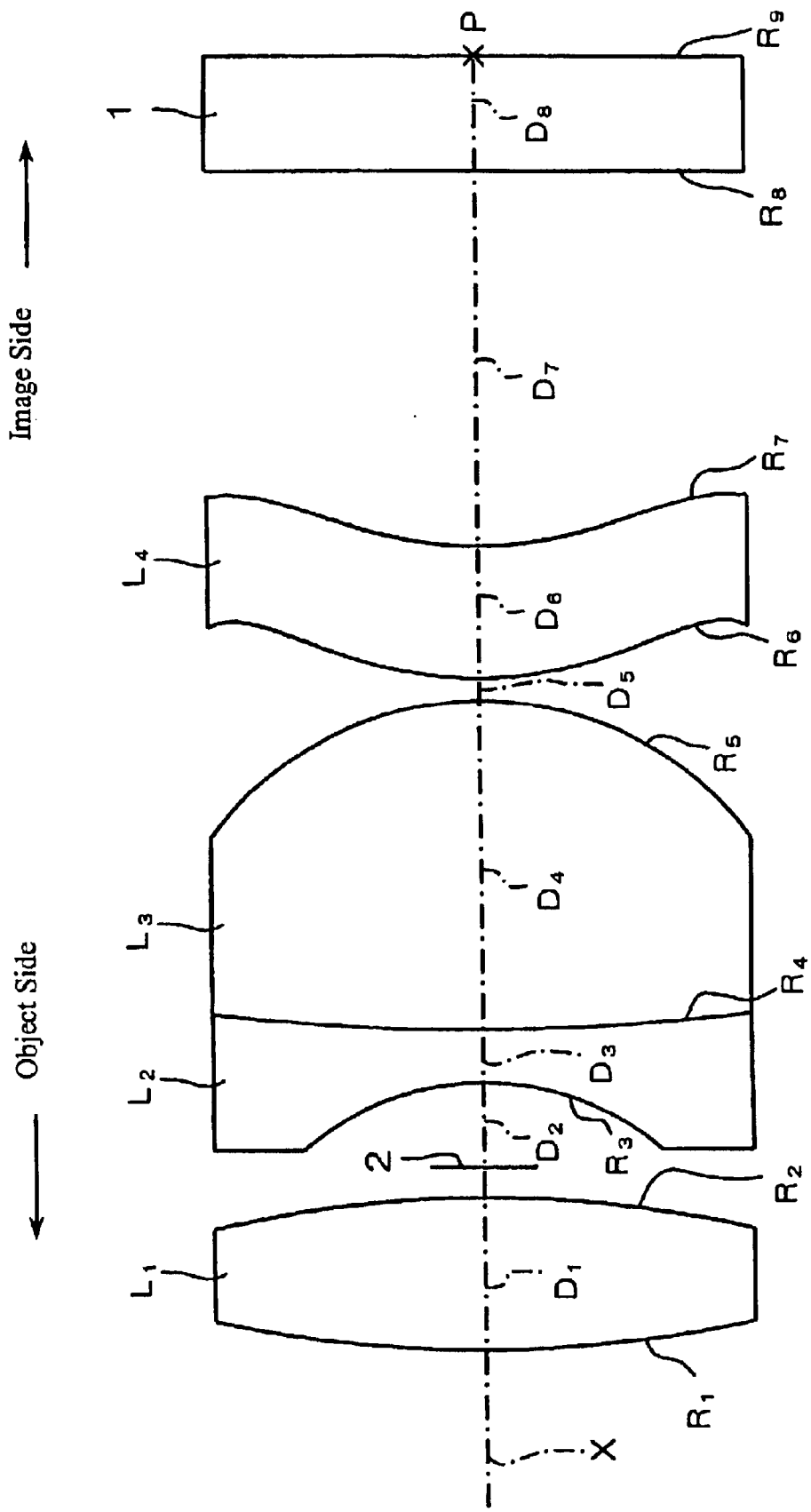
FIG. 2 shows the basic lens element configuration of a single focus lens having a short overall length according to Embodiment 2 of the present invention.

The invention will first be described in general terms with reference to the drawings. FIG. 1 is illustrative of the invention, wherein a single focus lens having a short overall length is formed of a first lens $L_1$ that has positive refractive power, a stop 2, a second lens $L_2$ that has negative refractive power, a third lens $L_3$ that has positive refractive power and a convex surface on the image side, and a fourth lens $L_4$ that is formed of plastic, has a meniscus shape with weak refractive power, and includes at least one surface that is aspheric and a concave surface on the image side. The single focus lens having a short overall length according to the present invention is configured such that a light beam that enters along the optical axis X is efficiently focused at the image position P, positioned as illustrated on the surface of cover glass 1. The cover glass 1 protects the image-detecting surfaces from damage.

The single focus lens of the present invention has its aberrations favorably corrected by means of a simple, compact, and inexpensive lens configuration that uses only four lens components. Preferably, each lens component consists of only a single lens element. A plastic lens having an aspheric surface is used as the fourth lens component $L_4$, and the above Conditions (1)–(3) are satisfied.

More particularly, the single focus lens of the present invention is configured using a second lens component $L_2$ of negative refractive power which is formed of an optical glass material having a high index of refraction and a high dispersion, as specified in Conditions (1) and (2) above. By using such a lens element for the second lens component $L_2$ in the single focus lens of the invention, image quality degradation can be prevented even when the on-axis distance from the lens surface nearest the object to the lens surface nearest the image of the single focus lens of the invention is shortened in comparison with conventional lenses. When Conditions (1) and (2) are not satisfied, chromatic aberrations and curvature of field become difficult to correct. Condition (3) insures that the refractive power of the fourth lens component $L_4$ is relatively weak as compared to that of the single focus lens. This enables the single focus lens to be made inexpensively and allows for favorable correction of aberrations in a simple manner.

As described above, the development of CCD technology has enabled the space between a front and rear lens group, in a single focus lens that includes a stop between these two lens groups, to be made shorter. Conventionally, because a shutter is positioned at the position of the stop, the space between the front and rear lens groups could not be made less than that required for the shutter mechanism. However, in recent years it has become possible to provide a shutter function to the CCD. Because a shutter mechanism is no longer required between the front and rear lens groups, the space between these lens groups can be decreased. The single focus lens of the present invention is configured with the above-described space shortened, thereby allowing a single focus lens having a short overall length to be achieved.

The fourth lens component $L_4$ of the present invention is primarily for correcting aberrations, and is formed of a meniscus-shaped lens having relatively weak refractive power with its concave surface on the image side, and with at least one surface thereof being aspheric. Because this fourth lens component $L_4$ has a relatively weak refractive power and functions primarily as a so-called correcting plate, its aspheric surface design is simplified.

Plastic is used in this fourth lens component $L_4$ in order for it to be processed easily into an aspheric surface. The shape of the aspheric surface is defined by Equation A below:

$$Z=[CY^2/\{1+(1-KC^2Y^2)^{1/2}\}]+A_3Y^3+A_4Y^4+A_5Y^5+A_6Y^6+A_7Y^7+A_8Y^8+A_9Y^9+A_{10}Y^{10} \quad \text{(Equation A)}$$

where

Z is the length (in mm) of a line drawn from a point on the aspheric surface at a distance Y from the optical axis to the tangential plane of the aspheric surface vertex, C (=1/R) is the curvature of the aspheric surface near the optical axis, Y is the distance (in mm) from the optical axis, K is the eccentricity, and $A_3$, $A_4$, $A_5$, $A_6$, $A_7$, $A_8$, $A_9$ and $A_{10}$ are the third through tenth aspheric coefficients.

By adding the odd-numbered coefficients to the usual curve for an aspheric surface, the number of degrees of freedom in selecting the shape of the lens and for correcting aberrations is increased, thereby improving the ease of manufacture and reducing costs. More specifically, the aspheric surface may be made with a shape which does not have a primary point of inflection within the effective diameter of the lens. When Condition (3) is not satisfied, the effect of temperature change on the optical properties of the fourth lens component that is made of plastic becomes excessive.

Embodiment 1

The single focus lens having a short overall length according to Embodiment 1 is formed of, in order from the object side; a first lens component $L_1$ that is biconvex with both its lens surfaces having the same radius of curvature and one of these lens surfaces positioned at the object side of said single focus lens; a stop 2; a second lens component $L_2$ that is biconcave with its lens surfaces having different radii of curvature, with the surface of smaller radius of curvature being on the object side; a third lens component $L_3$ that is biconvex having surfaces of different radii of curvature, with the surface of smaller radius of curvature being on the image side; and a fourth lens component $L_4$ that is made of plastic, is meniscus-shaped with its concave surface on the image side, has relatively weak refractive power, and both surfaces are aspheric and primarily correct for aberrations.

Table 1 below lists the surface number #, in order from the object side, the radius of curvature R (in mm) of each surface, the on-axis spacing between surfaces, as well as the index of refraction $N_d$ and the Abbe number $\upsilon_d$ (for the d-line) of each lens element of the single focus lens according to Embodiment 1 of the present invention. Those surfaces marked with an asterisk on the right side of the surface number are aspheric surfaces, as described above. In the lower portion of the table are listed the values corresponding to the focal length f of the single focus lens, the F-number $F_{NO}$, the image angle $2\omega$, and the values that correspond to the values listed in Conditions (1)–(3).

TABLE 1

| # | R | D | $N_d$ | $\nu_d$ |
|---|---|---|---|---|
| 1 | 13.8515 | 1.70 | 1.84666 | 23.8 |
| 2 | −13.8515 | 1.30 | | |
| 3 | −3.2957 | 0.60 | 1.92286 | 20.9 |
| 4 | 11.2147 | 0.03 | | |
| 5 | 13.3788 | 3.80 | 1.81600 | 46.6 |
| 6 | −3.8042 | 0.25 | | |
| 7* | 3.8500 | 1.50 | 1.49020 | 57.5 |
| 8* | 4.2500 | 4.40 | | |
| 9 | ∞ | 1.30 | 1.51680 | 64.2 |
| 10 | ∞ | | | | f = 6.56 mm
$F_{NO}$ = 4.8
$2\omega$ = 54.1°
$N_{d2}$ = 1.92286
$\nu_{d2}$ = 20.9
$|f/f_4|$ = 0.176

As is apparent from comparing the values listed in the last line of Table 1 with those given in Conditions (1)–(3) above, it is apparent that Embodiment 1 satisfies each of Conditions (1)–(3).

Table 2 below lists the values of the constant K and the aspheric coefficients $A_3$–$A_{10}$ for Equation A for each of the aspheric surfaces (#7 and #8) of Embodiment 1. An "E" in the data below indicates that the number following is the exponent to the base 10. For example, "1.0E−02" represents $1.0 \times 10^{-2}$.

TABLE 2

| # | K | $A_3$ | $A_4$ | $A_5$ |
|---|---|---|---|---|
| 7 | −4.1004 | −7.4637E−3 | 1.8371E−2 | −3.8733E−3 |

TABLE 2-continued

| | $A_6$ | $A_7$ | $A_8$ | $A_9$ | $A_{10}$ |
|---|---|---|---|---|---|
| | −7.4236E−4 | −6.1612E−4 | 4.4520E−4 | −5.2655E−5 | −5.8732E−6 |
| # | K | $A_3$ | $A_4$ | $A_5$ | |
| 8 | −1.8176024 | −9.8730E−3 | 1.7177E−2 | −3.0717E−3 | |
| | $A_6$ | $A_7$ | $A_8$ | $A_9$ | $A_{10}$ |
| | −1.7903E−3 | −9.0337E−4 | 1.0817E−3 | −2.9701E−4 | 2.5117E−5 |

FIGS. 3A–3D show the spherical aberration, astigmatism, distortion, and lateral color, respectively, of the single focus lens of Embodiment 1. The spherical aberration is shown for the C, d, and g lines, and the lateral color is shown for the C and g lines. The curves for the astigmatism and distortion are for the d-line, with both the sagittal S and tangential T image surfaces being shown in FIG. 3B. As is clear from these figures, the single focus lens having a short overall length of Embodiment 1 has its aberrations favorably corrected.

Embodiment 2

The single focus lens having a short overall length according to Embodiment 2 of the present invention has a substantially similar configuration to that of Embodiment 1, but differs in that the second lens component $L_2$ and the third lens component $L_3$ have surfaces with an identical radius of curvature so that these lenses may be cemented to one another to form a joined lens.

Table 3 below lists the surface number #, in order from the object side, the radius of curvature R (in mm) of each surface, the on-axis spacing between surfaces, as well as the index of refraction $N_d$ and the Abbe number $\nu_d$ (for the d-line) of each lens element of the single focus lens according to Embodiment 2 of the present invention. Those surfaces marked with an asterisk on the right side of the surface number are aspheric surfaces, as described above. In the lower portion of the table are listed the values corresponding to the focal length f of the single focus lens, the F-number $F_{NO}$, the image angle 2ω, and the values that correspond to the values listed in Conditions (1)–(3).

TABLE 3

| # | R | D | $N_d$ | $\nu_d$ |
|---|---|---|---|---|
| 1 | 13.6108 | 1.700 | 1.84666 | 23.8 |
| 2 | −13.6108 | 1.300 | | |
| 3 | −3.0178 | 0.600 | 1.92286 | 20.9 |
| 4 | 24.2458 | 3.700 | 1.81600 | 46.6 |
| 5 | −3.6787 | 0.250 | | |
| 6* | 3.8500 | 1.500 | 1.49020 | 57.5 |
| 7* | 4.2500 | 4.225 | | |
| 8 | ∞ | 1.300 | 1.51680 | 64.2 |
| 9 | ∞ | | | |

TABLE 3-continued

| # | R | D | $N_d$ | $\nu_d$ |
|---|---|---|---|---|
| f = 6.39 mm | | | | |
| $F_{NO}$ = 4.8 | | | | |
| 2ω = 55.4° | | | | |
| $N_{d2}$ = 1.92286 | | | | |
| $\nu_{d2}$ = 20.9 | | | | |
| $|f/f_4|$ = 0.171 | | | | |

Table 4 below lists the values of the constant K and the aspheric coefficients $A_3$–$A_{10}$ for Equation A for each of the aspheric surfaces (#6 and #7) of Embodiment 2. An "E" in the data below indicates that the number following is the exponent to the base 10. For example, "1.0E-02" represents $1.0 \times 10^{-2}$.

TABLE 4

| # | K | $A_3$ | $A_4$ | $A_5$ | |
|---|---|---|---|---|---|
| 6 | −4.9579 | −7.2378E−3 | 1.8082E−2 | −3.5411E−3 | |
| | $A_6$ | $A_7$ | $A_8$ | $A_9$ | $A_{10}$ |
| | −9.4281E−4 | −6.0949E−4 | 3.5637E−4 | −5.0158E−6 | −1.3664E−5 |
| # | K | $A_3$ | $A_4$ | $A_5$ | |
| 7 | −1.6651 | −1.2304E−2 | 1.7313E−2 | −3.4420E−3 | |
| | $A_6$ | $A_7$ | $A_8$ | $A_9$ | $A_{10}$ |
| | −1.8666E−3 | −7.6820E−4 | 9.9373E−4 | −2.8723E−4 | 2.7178E−5 |

FIGS. 4A–4D show the spherical aberration, astigmatism, distortion, and lateral color, respectively, of the single focus lens of Embodiment 2. The spherical aberration is shown for the C, d, and g lines, and the lateral color is shown for the C and g lines. The curves for the astigmatism and distortion are for the d-line, with both the sagittal S and tangential T image surfaces being shown in FIG. 4B. As is clear from these figures, the single focus lens having a short overall length of Embodiment 2 has its aberrations favorably corrected.

The invention being thus described, it will be obvious that the same may be varied in many ways. Thus, the present invention is not limited by the above-described embodiments, and other optical materials, on-axis spacings, surface curvatures and aspheric surface shapes, for example, may be suitably selected. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A single focus lens comprising, in order from the object side:

a first lens component having positive refractive power;

a stop;

a second lens component having negative refractive power;

a third lens component having positive refractive power with a convex surface on the image side; and a fourth lens component that is formed of plastic so as to have a meniscus shape, said fourth lens component serving as a correction plate for correction of aberrations, with at least one surface of the fourth lens component being aspheric and with the image-side surface of the fourth lens component being concave, wherein an expression which defines the shape of the aspheric surface of the fourth lens component includes at least one, non-zero, odd-numbered coefficient.

2. A single focus lens comprising, in order from the object side:

a first lens component having positive refractive power;

a stop;

a second lens component having negative refractive power;

a third lens component having positive refractive power with a convex surface on the image side; and a fourth lens component that is formed of plastic so as to have a meniscus shape, said fourth lens component serving as a correction plate for correction of aberrations, with at least one surface of the fourth lens component being aspheric and with the image-side surface of the fourth lens component being concave, wherein the second lens component is formed of a single lens element and the following Conditions (1) to (3) are satisfied:

| | |
|---|---|
| $N_{d2} > 1.8$ | Condition (1) |
| $v_{d2} < 25$ | Condition (2) |
| $|f/f_4| < 0.8$ | Condition (3) | where $N_{d2}$ is the refractive index at the d-line of the lens element of the second lens component, in order from the object side, $v_{d2}$ is the Abbe number at the d-line of the lens element of the second lens component, in order from the object side, f is the focal length of the single focus lens, and $f_4$ is the focal length of the fourth lens component, in order from the object side, wherein an expresion which defines the shape of the aspheric surface of the fourth lens component includes at least one, non-zero, odd-numbered coefficient.

3. A single focus lens comprising, in order from the object side:

a first lens component having positive refractive power, said first lens component consisting of a single lens element having a surface positioned at the object side of said single focus lens;

a stop;

a second lens component having negative refractive power;

a third lens component having positive refractive power with a convex surface on the image side; and a fourth lens component that is formed of plastic so as to have a meniscus shape, said fourth lens component serving as a correction plate for correction of aberrations, with at least one surface of the fourth lens component being aspheric and with the image-side surface of the fourth lens component being concave.

4. The single focus lens of claim 3, wherein an expression which defines the shape of the aspheric surface of the fourth lens component includes at least one, non-zero, odd-numbered coefficient.

* * * * *